S. W. LONG.
Machines for Tenoning Cogs.

No. 144,992. Patented Nov. 25, 1873.

Attest:
Jas. H. Layman.
John Kilroh.

S. W. Long
By Knight Bros.
Att'ys.

AM. PHOTO-LITHOGRAPHIC Co. N.Y. (OSBORNE'S PROCESS)

UNITED STATES PATENT OFFICE.

STEPHEN W. LONG, OF OWENSBOROUGH, KENTUCKY, ASSIGNOR TO HIMSELF AND THOMAS H. GUTHRIE, OF SAME PLACE.

IMPROVEMENT IN MACHINES FOR TENONING COGS.

Specification forming part of Letters Patent No. 144,992, dated November 25, 1873; application filed July 26, 1873.

*To all whom it may concern:*

Be it known that I, STEPHEN W. LONG, of Owensborough, Daviess county, Kentucky, have invented a new and useful Improvement in Machine for Tenoning Cogs, of which the following is a specification:

This invention relates to a machine for cutting the shanks of wooden cogs; which machine consists, essentially, of a supporting-frame, a rotating cutter-head, and a table upon which the cog is clamped, said table being adjustable to different angles, so as to impart the desired shape and position to the shanks, as hereinafter more fully explained.

Figure 1:
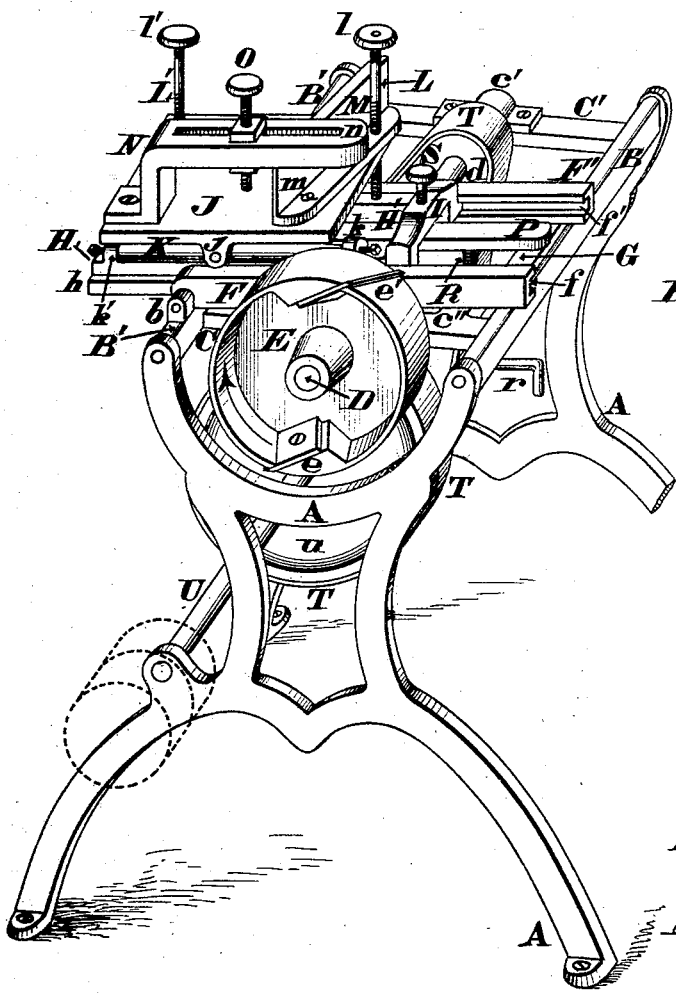
Figure 2:
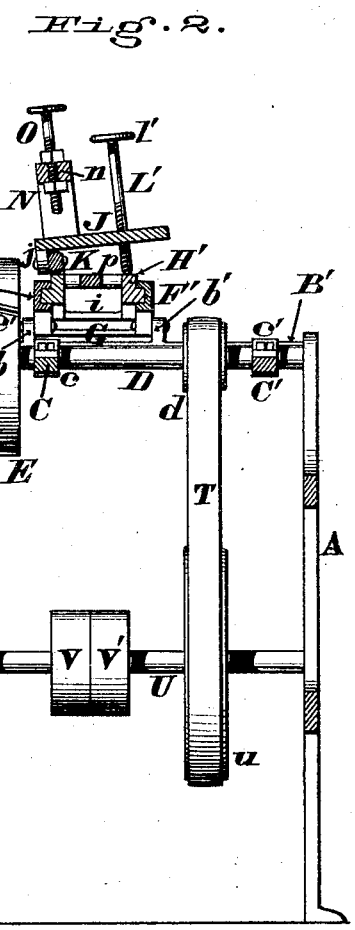
Figure 3:
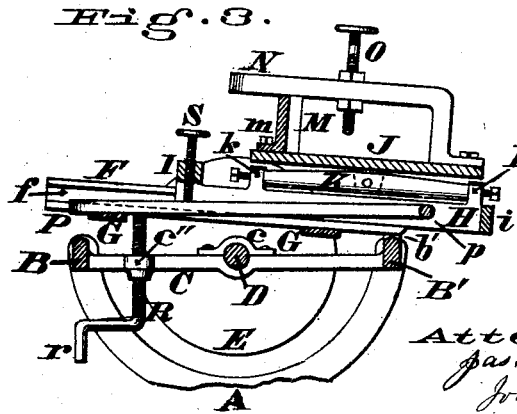
Figure 4:
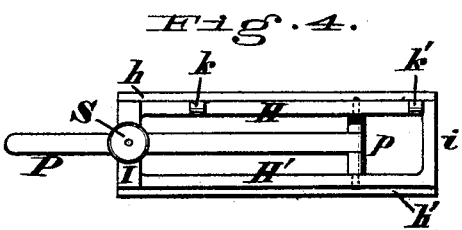

Figure 1 is a perspective view of my cog-shanking machine, a portion of the frame being broken away. Fig. 2 is a vertical section of the same in the plane of the cutter-shaft. Fig. 3 is a vertical section, through the upper portion of the machine in the plane, of the ways that support the table; and Fig. 4 is a plan of the carriage that supports the aforesaid table.

A represents a supporting-frame, provided with rails B B', to which are attached bars C C', whose boxes $c$ $c'$ afford journal-bearings for the shaft D of a cutter-head, E, which latter is armed with suitable knives, $e$ $e'$. Projecting upwardly from the rail B' are two studs, $b$ $b'$, to which are pivoted guides, ways, or tracks F F', that are maintained in a parallel position with reference to each other by the ties G. These ways are grooved at $f$ $f'$ to receive tongues $h$ $h'$ that project laterally from two bars, H H', whose front ends are united by a bridge, I, while their rear ends are secured together by a cross-rail, $i$. The devices H H' I $i$ constitute a carriage adapted to traverse the ways F F', and said carriage has a table, J, coupled to it in the following manner: Cast with the bar H are two ears, $k$ $k'$, to which a rock-shaft, K, is pivoted, as more clearly seen in Fig. 3. A lug, $j$, projecting from the table J, is pivoted to the rock-shaft K, at or near the mid-length of the latter. Tapped into the table J are two jack-screws, L L', whose lower ends bear upon the bar H', and the upper ends of said screws may be provided with winches or hand-wheels $l$ $l'$ to facilitate their manipulation. The table J is provided with a gage, M, that may be set at any desired angle, and maintained at such angle by the set-screw $m$. Secured to the rear end of the aforesaid table is an angular bracket, N, which is slotted at $n$, to receive a set-screw, O, wherewith the cog is clamped down firmly upon the adjustable table. P is a handle, composed of a flat bar, whose T-head $p$ is pivoted within the bars H H', as shown in Fig. 4, and said handle is supported upon a screw, R, which engages with a lug, $c''$, of the bar C, Fig. 3. This screw is operated by a crank, $r$. Tapped into the bridge I is a set-screw, S, that bears upon the upper surface of the handle P. Keyed to the cutter-shaft D is a small pulley, $d$, around which passes a band, T, which is driven by the large pulley $u$ of counter-shaft U. This counter-shaft carries a fast pulley, V, and a loose one, V', which may be applied as shown in Fig. 2, or they may be mounted upon either end of the shaft U, as suggested by dotted lines in Fig. 1.

The wooden cog is first clamped to the table J by screw O, in such a manner as to allow one end of said cog to project beyond the front edge of said table, this projection being equal to the desired length of the shank. The cutter-head E is then rotated in the direction indicated by the arrow, (see Fig. 1,) and the shank is cut by the cog being forced against the knives $e$ $e'$, it being understood that the table J is at the right end of the ways F F' when the block is attached. The desired position, thickness, and taper to be imparted to the shanks are governed by the manner in which the jack-screws L L' are manipulated, they being rotated so as to elevate the rear side of the table J, if it is desired to taper said shanks; but, if the sides of the shanks are to be parallel, the table J is brought to a horizontal position. If, on the contrary, the shanks are to be wider at their outer ends than at their inner ends, or, in other words, where they join the cog, then the rear edge of the table J is to be depressed below a horizontal position. In whatever position the table may be placed, the rock-shaft K will turn in its bearings $k\ k'$, so as to accommodate itself to such change. If the shanks are to be cut across the block at right angles with the edge of the cog, the gage M is set parallel with one end of the table; but, if the shanks are not to be at the right angles with the edge of the cog, then said gage is to be shifted accordingly, as shown in Fig. 1. If the shanks are to be cut shallow on one edge and deeper on the other, the screws L L' are manipulated so as to turn the table J upon its pivot $j$, and incline said table sufficiently to impart the desired bevel to the cog-shank. The carriage H H' I $i$, with its attached table J, is advanced or retracted along the ways F F' by the handle P, and, during these movements, said handle rides upon the screw R, which screw, in conjunction with the one S, serves to impart the proper pitch to the inclined ways or guides. As the shanks are cut while the carriage is descending the inclined ways F F', the operator sees all the movements of the machine, and he controls the action of said carriage by the handle P.

I claim as my invention—

In combination with the rotary cutter-head E $e\ e'$, the pivoted and grooved ways $b\ b'$ F F' $f\ f'$, reciprocating carriage H H' $h\ h'\ k\ k'$ I $i$, adjustable table J $j$, rock-shaft K, clamp N $n$ O, and set-screws L, L', R, and S, as and for the purpose specified.

In testimony of which invention I hereunto set my hand.

STEPHEN W. LONG.

Attest:
 E. B. COLGAN,
 F. H. GUTHRIE.